United States Patent
Tanaka et al.

(10) Patent No.: US 12,388,324 B2
(45) Date of Patent: Aug. 12, 2025

(54) ROTATING ELECTRICAL MACHINE

(71) Applicant: AISIN CORPORATION, Aichi (JP)

(72) Inventors: Koki Tanaka, Kariya (JP); Takahiro Yoneda, Kariya (JP)

(73) Assignee: AISIN CORPORATION, Kariya (JP)

( * ) Notice: Subject to any disclaimer, the term of this patent is extended or adjusted under 35 U.S.C. 154(b) by 169 days.

(21) Appl. No.: 18/039,748

(22) PCT Filed: Feb. 15, 2022

(86) PCT No.: PCT/JP2022/005892
§ 371 (c)(1),
(2) Date: Jun. 1, 2023

(87) PCT Pub. No.: WO2022/185902
PCT Pub. Date: Sep. 9, 2022

(65) Prior Publication Data
US 2024/0022135 A1    Jan. 18, 2024

(30) Foreign Application Priority Data

Mar. 4, 2021    (JP) .................................. 2021-034657

(51) Int. Cl.
*H02K 9/19*     (2006.01)
*H02K 5/18*     (2006.01)
*H02K 5/20*     (2006.01)

(52) U.S. Cl.
CPC ................. *H02K 9/19* (2013.01); *H02K 5/18* (2013.01); *H02K 5/203* (2021.01)

(58) Field of Classification Search
CPC .............................. H02K 5/203; H02K 1/185
See application file for complete search history.

(56) References Cited

U.S. PATENT DOCUMENTS

| | | | |
|---|---|---|---|
| 11,114,921 B2* | 9/2021 | Ito ......................... | F16H 57/045 |
| 11,318,834 B2* | 5/2022 | Suyama .............. | F16H 57/0409 |
| 2022/0123628 A1* | 4/2022 | Nakamatsu .............. | H02K 5/20 |
| 2023/0327518 A1* | 10/2023 | Horio ..................... | H02K 5/203 |
| | | | 310/52 |
| 2024/0051378 A1* | 2/2024 | Inoue ..................... | H02K 5/203 |

FOREIGN PATENT DOCUMENTS

JP    2019-170030 A    10/2019

OTHER PUBLICATIONS

Apr. 26, 2022 International Search Report issued in International Patent Application No. PCT/JP2022/005892.

* cited by examiner

*Primary Examiner* — Oluseye Iwarere
*Assistant Examiner* — Masoud Vaziri
(74) *Attorney, Agent, or Firm* — Oliff PLC

(57) ABSTRACT

A rotating electrical machine includes: a rotor; a stator including a stator core and a coil and including a radial protrusion for fastening located above a rotation center of the rotor; a housing member that houses the rotor and the stator and to which the radial protrusion is fastened; and an oil passage portion located above the rotation center of the rotor and extending in an axial direction within a range in which the stator core extends in the axial direction, the oil passage portion having a discharge hole that discharges oil in a direction toward a position radially outward of the radial protrusion as viewed in the axial direction.

12 Claims, 11 Drawing Sheets

A-A

D-D

ROTATING ELECTRICAL MACHINE

TECHNICAL FIELD

The present disclosure relates to rotating electrical machines.

BACKGROUND ART

There is known a technique in which a stator having radial protrusions (also referred to as "bolting portions") for fastening to a case is provided, and the stator is cooled by discharging oil to the outer peripheral surface of a stator core by using an oil passage portion in a pipe located above the rotation center of a rotor and extending in the axial direction. In this technique, in order to cause the oil to properly spread to a portion below the bolting portion, the pipe itself is rotated by a rotation mechanism to change the discharge direction in which the oil is discharged from discharge ports of the pipe.

RELATED ART DOCUMENTS

Patent Documents

Patent Document 1: Japanese Unexamined Patent Application Publication No. 2019-170030 (JP 2019-170030 A)

SUMMARY OF THE DISCLOSURE

Problem to be Solved by the Disclosure

However, the related art as described above has a complicated configuration because, for example, the rotation mechanism is provided. It is therefore difficult to properly cool the stator by using a simple configuration.

Accordingly, in one aspect, it is an object of the present disclosure to properly cool a stator having a radial protrusion by using a simple configuration.

Means for Solving the Problem

In one aspect, a rotating electrical machine is provided that includes a rotor,
  a stator including a stator core and a coil and including a radial protrusion for fastening located above a rotation center of the rotor,
  a housing member that houses the rotor and the stator and to which the radial protrusion is fastened, and
  an oil passage portion located above the rotation center of the rotor and extending in an axial direction within a range in which the stator core extends in the axial direction, the oil passage portion having a discharge hole that discharges oil in a direction toward a position radially outward of the radial protrusion as viewed in the axial direction.

The rotating electrical machine further includes a rib portion that is provided above the rotation center of the rotor in the housing member, that protrudes radially inward from an inner peripheral surface of the housing member, and that overlaps the stator core as viewed in an up-down direction.

The discharge hole is provided within a range in which the rib portion extends in the axial direction.

The oil passage portion, the radial protrusion, and the rib portion are located in this order as viewed in the axial direction.

Effects of the Disclosure

In one aspect, according to the present disclosure, a stator having a radial protrusion can be properly cooled by using a simple configuration.

MODES FOR CARRYING OUT THE DISCLOSURE

Figure 1:
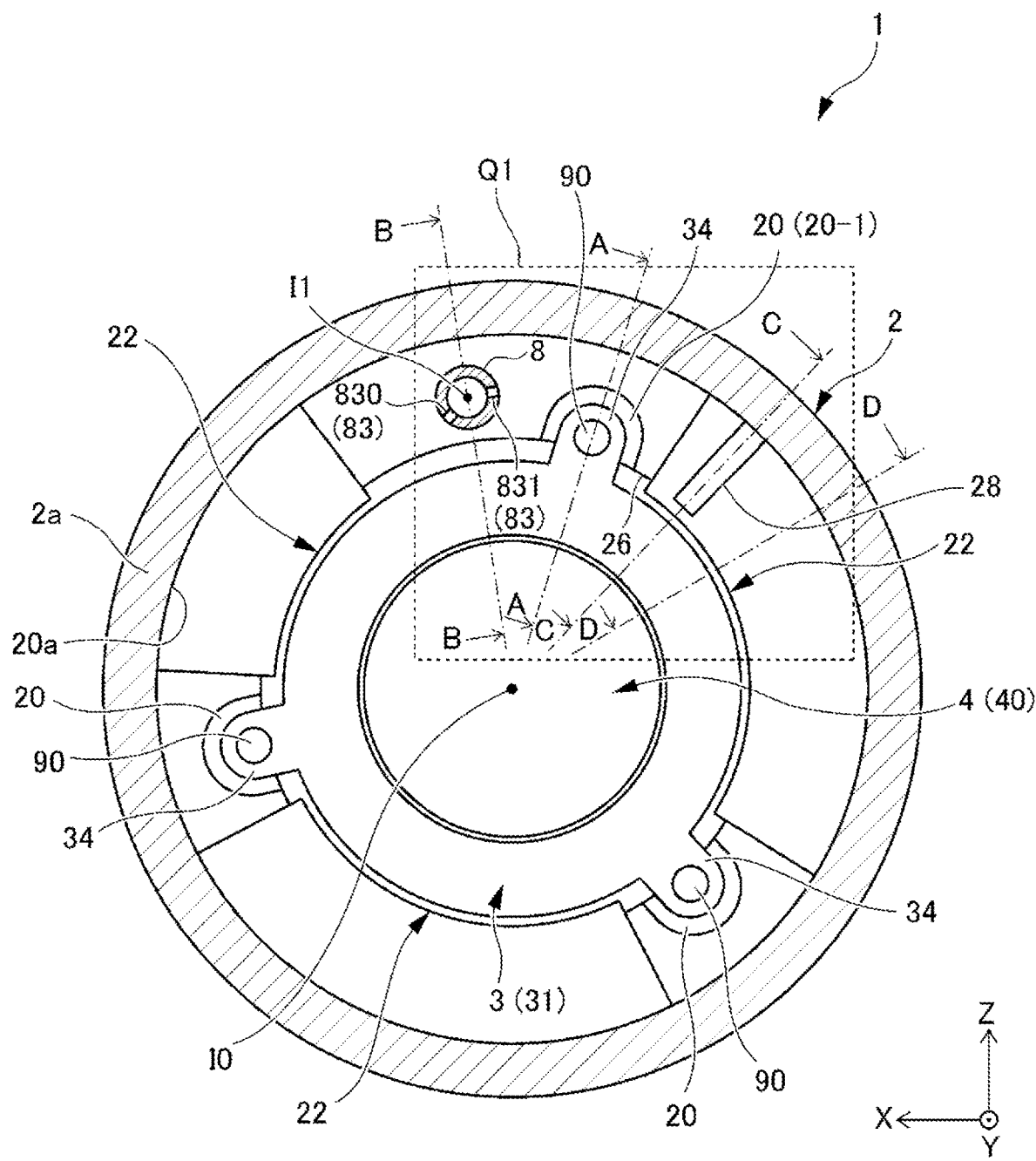
FIG. 1 is a plan view schematically showing a rotating electrical machine according to an embodiment.

Embodiments will be described in detail below with reference to the accompanying drawings. The dimensional ratios in the drawings are merely illustrative, and are not limited to these. The shapes etc. in the drawings may be partially exaggerated for convenience of explanation. For simplicity, reference signs may be given only to part of a plurality of portions having the same attribute throughout the drawings.

Figure 2:
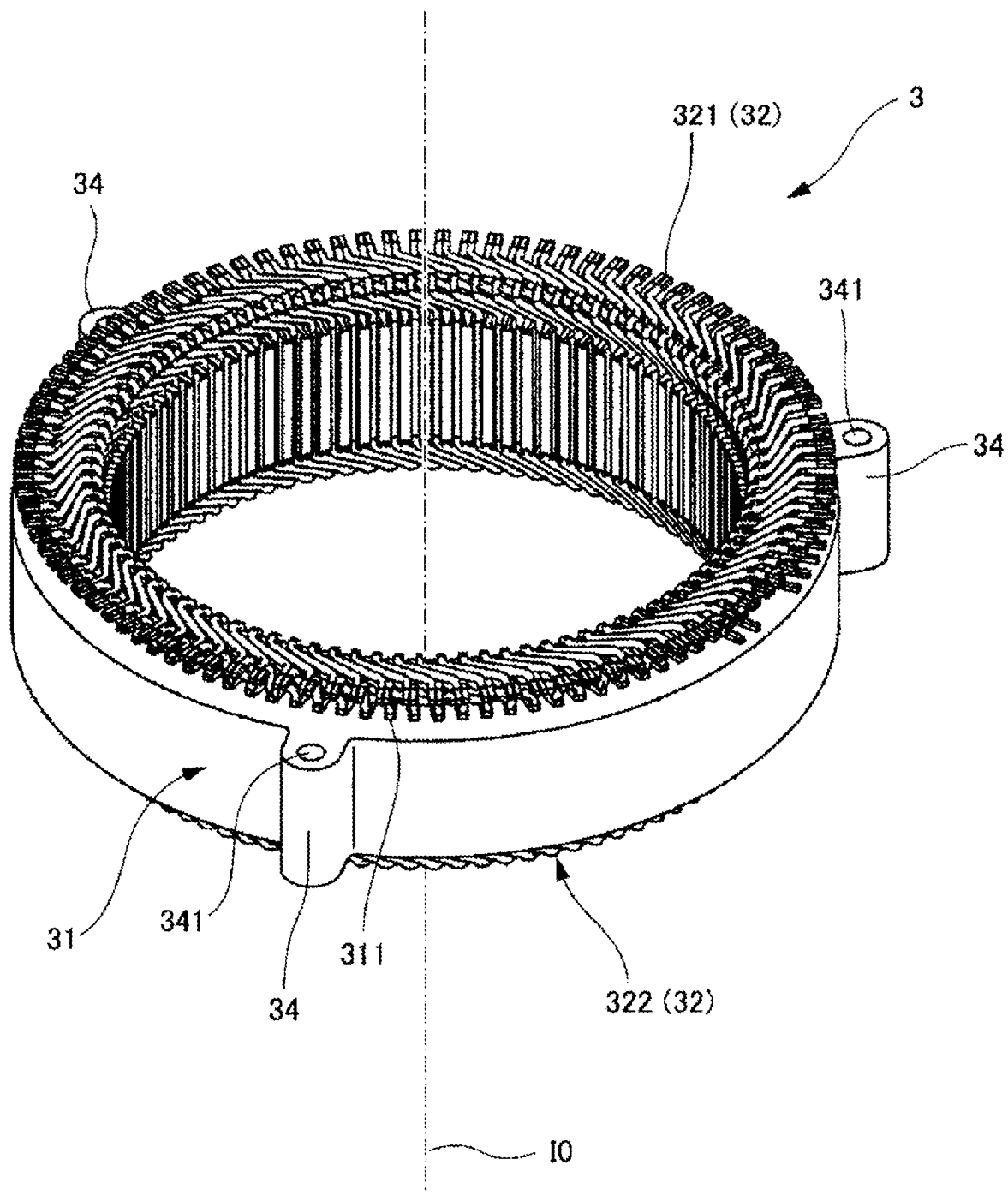
FIG. 2 is a perspective view showing an example of a stator.
Figure 3:
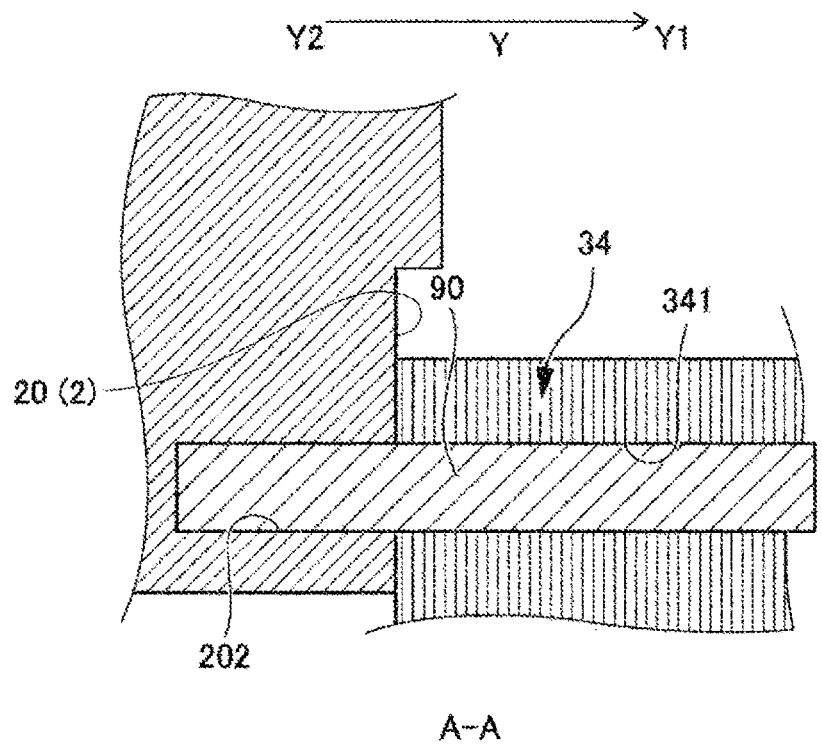
FIG. 3 is a schematic sectional view taken along line A-A in FIG. 1.
Figure 4:
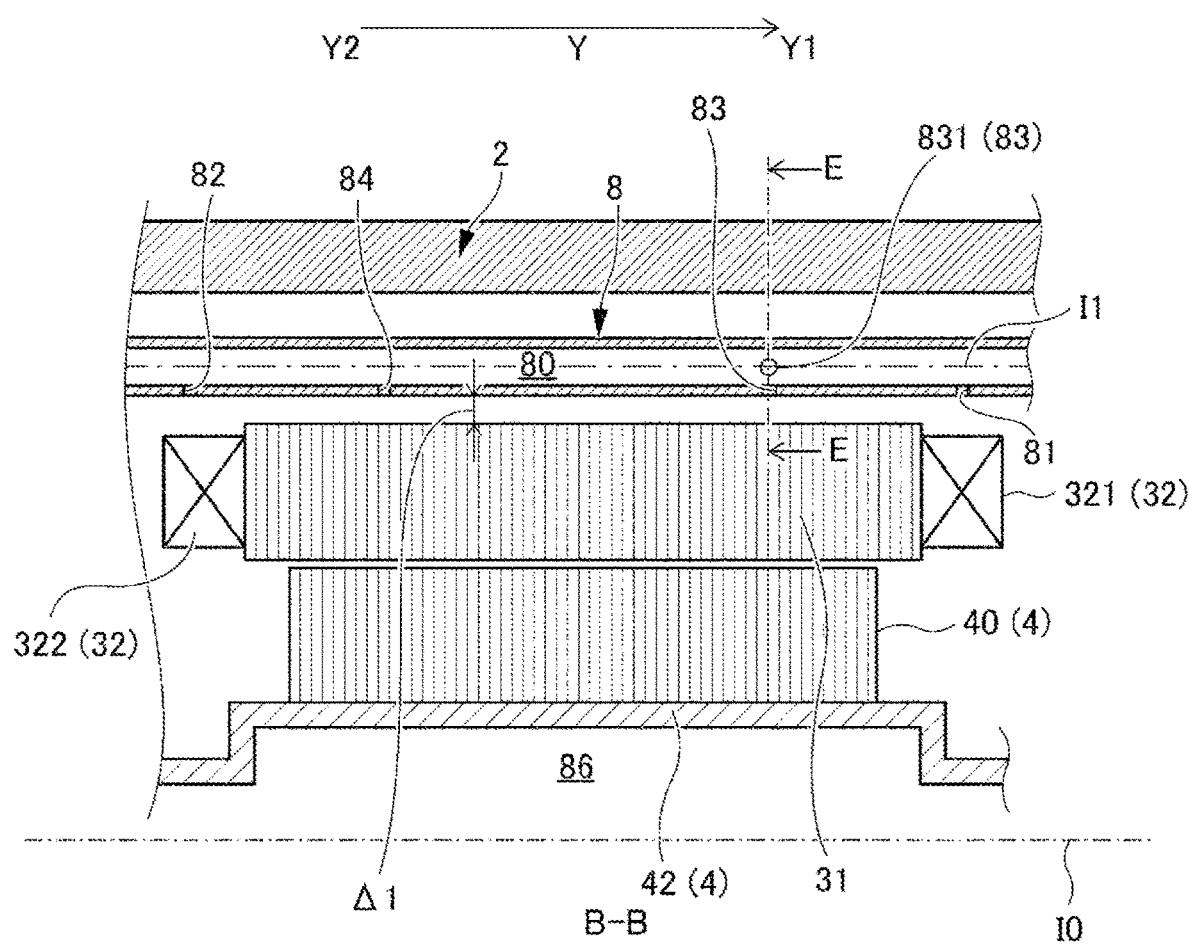
FIG. 4 is a schematic sectional view taken along line B-B in FIG. 1.
Figure 5:
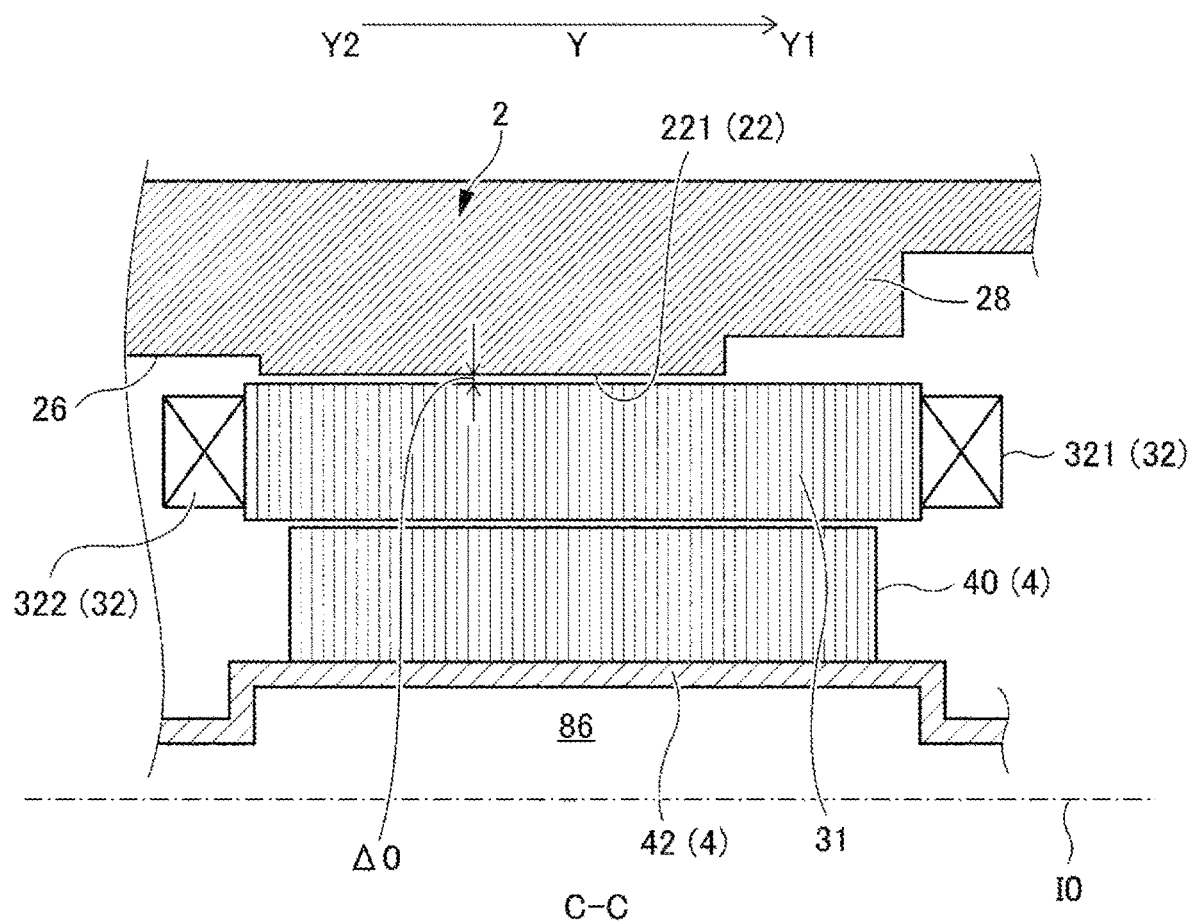
FIG. 5 is a schematic sectional view taken along line C-C in FIG. 1.
Figure 6:
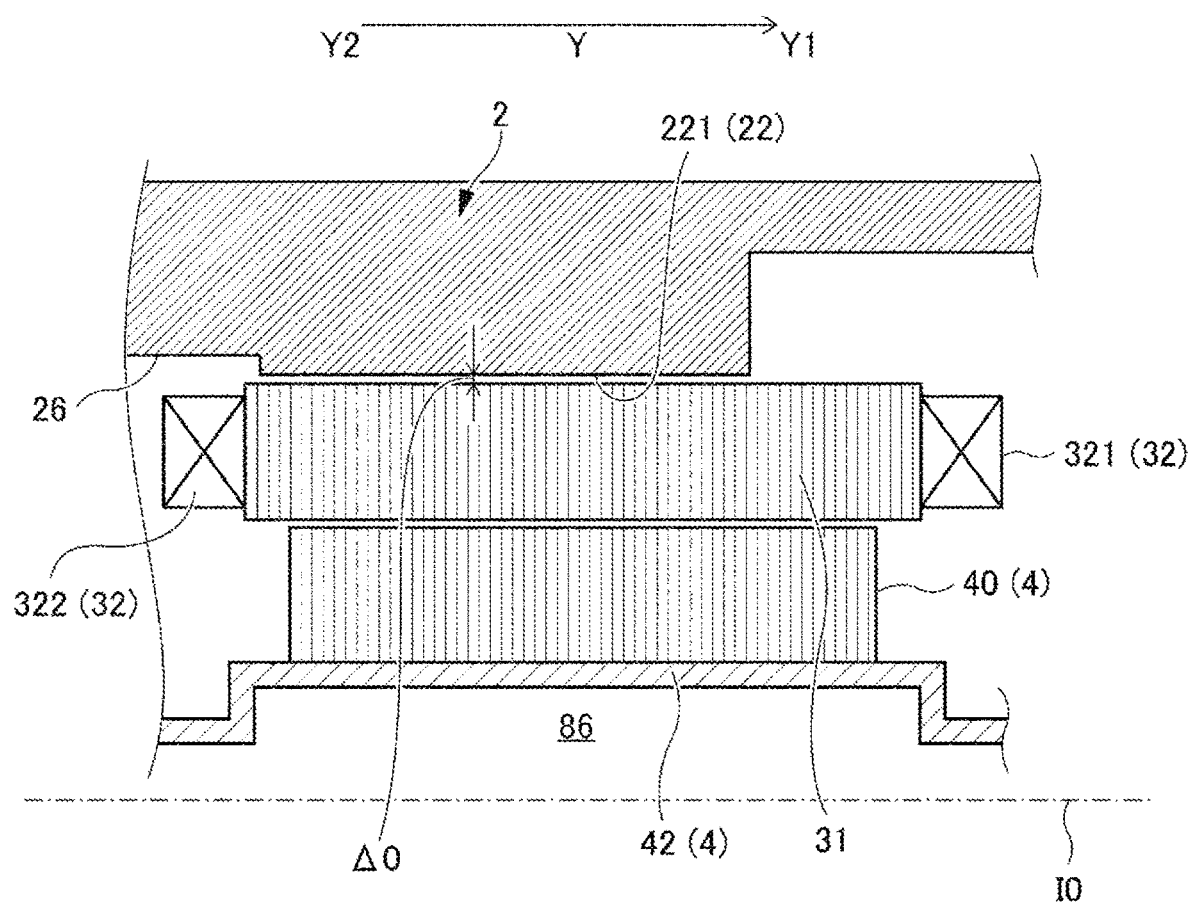
FIG. 6 is a schematic sectional view taken along line D-D in FIG. 1.

FIG. 1 is a plan view schematically showing a rotating electrical machine 1 according to an embodiment. In FIG. 1, X, Y, and Z axes are defined in a right-handed coordinate system, and a Y direction is parallel to the direction in which a central axis I0 (design central axis I0) of the rotating electrical machine 1 extends. A Z direction corresponds to an up-down direction, and the positive side in the Z direction corresponds to an upper side. The Z direction need not necessarily be parallel to the direction of gravity. FIG. 1 is a plan view as viewed in the Y direction, and only a peripheral wall portion 2a of a case 2 is shown in section (planar section taken along an XZ plane). An axial direction, a radial direction, and a circumferential direction hereinafter represent directions based on a rotating body about the central axis I0. FIG. 2 is a perspective view showing an example of a stator 3. FIG. 3 is a schematic sectional view taken along line A-A in FIG. 1. FIG. 4 is a schematic sectional view taken along line B-B in FIG. 1. FIG. 5 is a schematic sectional view taken along line C-C in FIG. 1. FIG. 6 is a schematic sectional view taken along line D-D in FIG. 1. In FIGS. 3 to 6, a Y1 side (positive side in the Y direction) and a Y2 side (negative side in the Y direction) in the Y direction are defined.

The rotating electrical machine 1 includes the case 2, the stator 3, a rotor 4, and a tubular member 8.

The case 2 forms a chamber that houses the stator 3. The case 2 supports the stator 3. The case 2 may be formed by, for example, casting aluminum. The case 2 may be implemented by two or more case members. The case 2 may form part of a chamber that houses elements other than the rotating electrical machine 1 (e.g., an inverter and a power transmission mechanism, both not shown).

The case 2 includes a fastening portion 20, a stator holding portion 22, a side wall portion 26, and a rib portion 28.

The fastening portion 20 is a portion for fastening the stator 3 to the case 2. A plurality of the fastening portions 20 may be provided around the central axis I0 as viewed in the axial direction. In the present embodiment, for example, the fastening portions 20 are provided at three positions at intervals of 120° corresponding to radial protrusions 34 of the stator 3 described later. Each fastening portion 20 forms a seating portion (seating portion for the radial protrusion 34) parallel to the XZ plane, and has a fastening hole 202 (see FIG. 3). A fastener 90 such as a bolt may be screwed into each fastening hole 202. Of the three fastening portions 20, the upper fastening portion 20 is hereinafter also referred to as "fastening portion 20-1."

The stator holding portion 22 has a function to maintain the attitude of the stator 3 (e.g., a function to prevent tilting of the stator 3, which is also referred to as "stator holding function"). The stator holding portion 22 forms a curved holding surface 221 in order to implement such a stator holding function. The curved holding surface 221 extends in the axial direction and faces the outer peripheral surface of a stator core 31 in the radial direction. A radial clearance $\Delta 0$ (see FIG. 5) between the curved holding surface 221 and the outer peripheral surface of the stator core 31 may have a very small value such as approximately zero, and may correspond to, for example, the maximum value in a possible deviation range (variable range due to allowable tolerance etc.) with respect to a design value (nominal value) of the outside diameter of the stator core 31. In this case, the curved holding surface 221 may contact the outer peripheral surface of the stator core 31 in the radial direction depending on the individual stator core 31. Alternatively, the radial clearance $\Delta 0$ (see FIG. 5) between the curved holding surface 221 and the outer peripheral surface of the stator core 31 may have a value slightly larger than the maximum value in the possible deviation range with respect to the design value of the outside diameter of the stator core 31. In either case, the outer peripheral surface of the stator core 31 comes into contact with the curved holding surface 221 when the attitude of the stator 3 changes in such a manner that the axis of the stator 3 is tilted with respect to the normal central axis I0. The stator holding function thus reduces the change in attitude of the stator 3. In the following description, it is assumed that the clearance $\Delta 0$ is approximately zero.

The curved holding surface 221 is preferably part of the outer peripheral surface of a cylindrical body about the central axis I0. That is, the curved holding surface 221 is preferably a surface formed by offsetting the outer peripheral surface of the stator core 31 in a normal form radially outward. In this case, the radial clearance $\Delta 0$ (see FIG. 5) between the curved holding surface 221 and the outer peripheral surface of the stator core 31 is constant along the entire circumferential length of the curved holding surface 221 when the outside diameter of the stator core 31 is the design value (nominal value).

A plurality of the stator holding portions 22 may be provided. In the present embodiment, the stator holding portions 22 are provided on both sides of the fastening portion 20-1 in the circumferential direction so as to sandwich the fastening portion 20-1 therebetween in the circumferential direction. The two stator holding portions 22 provided on both sides of the fastening portion 20-1 in the circumferential direction are hereinafter also referred to as "pair of stator holding portions 22." The stator holding portion 22 may be provided at a position other than on both sides of the fastening portion 20-1 in the circumferential direction. In the example shown in FIG. 1, a total of three stator holding portions 22 are provided so as to form a pair on both sides of each fastening portion 20.

The set range of the stator holding portion 22 (curved holding surface 221) in the circumferential direction (circumferential range facing the stator holding portion 22 in the radial direction out of the entire circumference of the stator core 31) is adapted so as to properly implement the stator holding function of the stator holding portion 22. The larger the set range of the stator holding portion 22 in the circumferential direction, the more the material cost tends to increase. Therefore, the set range of the stator holding portion 22 in the circumferential direction may be kept to the minimum required. In the present embodiment, the stator holding portions 22 are distributed in the circumferential direction so as to form a pair on both sides of each fastening portion 20. Efficient arrangement can thus be implemented.

Similarly, the set range of the stator holding portion 22 (curved holding surface 221) in the axial direction (axial range facing the stator holding portion 22 in the radial direction out of the entire axial length of the stator core 31) is adapted so as to properly implement the stator holding function of the stator holding portion 22. The larger the set range of the stator holding portion 22 in the axial direction, the more the material cost tends to increase. Therefore, the set range of the stator holding portion 22 in the axial direction may be kept to the minimum required.

The side wall portion 26 is located on the Y2 side in the Y direction with respect to the pair of stator holding portions 22 and extends in the circumferential direction concentrically with the central axis I0. The side wall portion 26 is provided so as to adjoin each of the pair of stator holding portions 22 in the axial direction on the Y2 side in the Y direction. That is, the side wall portion 26 is provided so as to be continuous from the ends on the Y2 side of the pair of stator holding portions 22 toward the Y2 side. Separate side wall portions 26 may be provided for the pair of stator holding portions 22, or a single side wall portion 26 that is continuous in the circumferential direction may be provided for the pair of stator holding portions 22. The side wall portion 26 may extend to the Y2 side with respect to the fastening portion 20.

The side wall portion 26 is located farther away from the central axis I0 in the radial direction than the curved holding surface 221. In the example shown in FIG. 5, the side wall portion 26 does not face the stator core 31 in the radial direction, but faces a coil end 322 on the Y2 side in the radial direction. In a modification, the side wall portion 26 may face the end on the Y2 side of the stator core 31 in the radial direction and face the coil end 322 on the Y2 side in the radial direction.

The rib portion 28 is provided on the case 2. In the present embodiment, the rib portion 28 is integral with the case 2. However, the rib portion 28 may be a separate member from the case 2 and may be attached to the case 2. The rib portion 28 protrudes radially inward from an inner peripheral surface 20a of the peripheral wall portion 2a of the case 2.

The rib portion 28 extends in the axial direction and the radial direction in an annular space between the inner peripheral surface 20a of the peripheral wall portion 2a of the case 2 and the stator 3. That is, the rib portion 28 extends in the axial direction and the radial direction at a position radially outward of a rotor core 40 and radially inward of the peripheral wall portion 2a of the case 2. The rib portion 28 extends within a range overlapping the stator core 31 as viewed in the radial direction. That is, the rib portion 28 extends in the axial direction in the range in which the stator core 31 extends in the axial direction. The rib portion 28 extends in the radial direction such that its radially inner end is separated from the outer peripheral surface of the stator core 31 in the radial direction.

In the present embodiment, as shown in FIG. 5, the rib portion 28 is continuous on its Y2 side with the stator holding portion 22, and extends from the stator holding portion 22 toward the Y1 side in the Y direction. As shown in FIG. 5, the rib portion 28 extends, on its Y1 side, to substantially the same axial position as the end on the Y1 side of the stator core 31. In a modification, the rib portion 28 may extend, on its Y1 side, to such an axial position that the rib portion 28 overlaps a coil end 321 as viewed in the radial direction, or may extend, on its Y1 side, only to a position located on the Y2 side with respect to the axial position shown in FIG. 5.

The rib portion 28 is provided at such a circumferential position that the rib portion 28 and the tubular member 8 sandwich the fastening portion 20-1 (and therefore the radial protrusion 34 for fastening that is fastened to the fastening portion 20-1) therebetween in the circumferential direction. That is, the rib portion 28 is provided at such a circumferential position that the fastening portion 20-1 is located between the rib portion 28 and the tubular member 8 as viewed in the axial direction.

As will be described later with reference to FIG. 7B, the rib portion 28 has a function to drop oil flowing along the inner peripheral surface 20a of the peripheral wall portion 2a of the case 2 onto the outer peripheral surface of the stator core 31 (hereinafter referred to as "oil dropping function"). In order to implement this oil dropping function, the rib portion 28 overlaps the stator core 31 as viewed in the up-down direction (Z direction).

A plurality of the rib portions 28 may be provided so as to be separated from each other. For example, the plurality of rib portions 28 may be provided so as to be separated from each other in the axial direction, or the plurality of rib portions 28 may be provided at different positions in the circumferential direction.

Moreover, the rib portion 28 may be in any form as long the oil dropping function can be implemented. For example, the rib portion 28 may have a curved portion or a bent portion. In the present embodiment, for example, the rib portion 28 has a rectangular shape as viewed in the axial direction. In this case, the rib portion 28 may have a tapered shape whose circumferential width gradually decreases toward the radially inner side.

The stator 3 is provided concentrically with the central axis I0. That is, the central axis (axial center) of the stator 3 coincides with the central axis I0. The stator 3 includes the stator core 31 and a coil 32.

The stator core 31 may be formed by, for example, stacking electrical steel sheets. The coil 32 is in the form of, for example, a coil wire having a rectangular cross section, and is wound in slots 311 of the stator core 31. The coil 32 forms the coil ends 321, 322 on both sides in the axial direction of the stator core 31.

In the present embodiment, the stator 3 includes the radial protrusions 34 for fastening. The radial protrusions 34 for fastening are in such a form that they protrude in the radial direction, and are also referred to as "bolting portions." The radial protrusions 34 for fastening are provided in order to fix the stator 3 to the case 2 by fastening. The radial protrusions 34 may be integral with the stator core 31, or may be separate members from the stator core 31 and may be connected to the stator core 31. As shown in FIG. 2, the radial protrusions 34 for fastening may extend along the entire axial length of the stator core 31. The radial protrusions 34 for fastening may be provided at regular intervals in the circumferential direction. In the example shown in FIG. 2, the radial protrusions 34 are provided at three positions at intervals of 120°.

Each radial protrusion 34 for fastening has a fastening hole 341. For example, the fastening hole 341 is formed so as to extend through the radial protrusion 34 in the axial direction. The fastener 90 is inserted through each fastening hole 341. As shown in FIGS. 2 and 3, the stator 3 is fastened and fixed to the case 2 by screwing the fasteners 90 into the fastening portions 20 of the case 2 through the fastening holes 341.

The rotor 4 is provided radially inward of the stator 3. As schematically shown in FIG. 4, the rotor 4 includes the rotor core 40 and a rotor shaft 42.

The rotor core 40 may be formed by, for example, stacking electrical steel sheets. Permanent magnets (not shown) may be embedded in the rotor core 40.

The rotor shaft 42 is preferably a hollow member as shown in FIG. 4. In this case, oil can be supplied to an axial oil passage 86 that is the hollow interior of the rotor shaft 42, so that the rotor core 40 and/or the permanent magnets can be cooled from the radially inner side by the oil. The rotor shaft 42 may have oil holes (not shown) that can discharge the oil in the axial oil passage 86 toward the coil ends 321, 322 by using a centrifugal force.

The tubular member 8 extends in the axial direction in the annular space between the inner peripheral surface 20a of the peripheral wall portion 2a of the case 2 and the stator 3. That is, the tubular member 8 extends in the axial direction at a position radially outward of the rotor core 40 and radially inward of the peripheral wall portion 2a of the case 2. Hereinafter, the tubular member 8 refers to a portion of a generally tubular member that extends within a range overlapping the stator 3 in the radial direction, unless otherwise specified. The tubular member 8 may be bent etc. in the radial direction at a position outside the range overlapping the stator 3 in the radial direction. For example, the tubular member 8 may be inserted from the Y1 side into the case 2 and may have a free end on the Y2 side. In this case, the end on the Y2 side of the tubular member 8 may be a closed end. For example, the end on the Y2 side (free end) of the tubular member 8 may be closed by a separate plug member. In a modification, for example, the tubular member 8 may be inserted from the Y2 side into the case 2 and may have a free end on the Y1 side, or the tubular member 8 may be configured so that the tubular member 8 does not have a free end and the internal space (oil passage 80) of the tubular member 8 communicates with an oil passage inside the case (not shown).

The tubular member 8 is disposed above the central axis I0. The tubular member 8 is preferably provided at a position higher than the highest position of the stator core 31 (highest position of the stator core 31 excluding the radial protrusions 34). The stator 3 can thus be efficiently cooled from above by the oil discharged from the tubular member 8. For example, as shown in FIG. 1, the tubular member 8 may be provided near the top part of the annular space between the inner peripheral surface 20a of the peripheral wall portion 2a of the case 2 and the stator 3. In the example shown in FIG. 1, the tubular member 8 is set at the uppermost position (top position) about the central axis I0. However, the tubular member 8 may be set at a position that slightly deviates from the top position (e.g., a position within 45°).

The tubular member 8 has the oil passage 80 inside. The tubular member 8 is preferably in the form of a hollow pipe. In this case, the tubular member 8 can be easily formed from an existing pipe material.

The sectional shape of the tubular member 8 (sectional shape taken along the XZ plane) is, for example, a circle, but may be other shape (e.g., a rectangle). The tubular member 8 may have the same sectional shape along its entire axial length. A central axis I1 of the tubular member 8 may be located at the same distance (same diameter) from the central axis I0. That is, the central axis I1 of the tubular member 8 may be parallel to the central axis I0.

The tubular member 8 is preferably provided at such a radial position that the tubular member 8 is less likely to cause an increase in overall radial size of the rotating electrical machine 1 including the case 2. For example, the radially innermost part of the tubular member 8 is located closer to the central axis I0 in the radial direction than the radially outermost part of the radial protrusion 34. In this case, the radially outermost part of the tubular member 8 is not separated too much from the central axis I0 in the radial direction. This can reduce the possibility that the overall radial size of the rotating electrical machine 1 may increase due to the tubular member 8.

In the present embodiment, as shown in FIG. 4, the tubular member 8 is provided near the outer peripheral surface of the stator core 31 so as to be separated away from the outer peripheral surface of the stator core 31 by a relatively small clearance Δ1. In the example shown in FIG. 4, the radial clearance Δ1 (see FIG. 4) between the tubular member 8 and the outer peripheral surface of the stator core 31 may be slightly larger than Δ0 (see FIG. 5) described above. That is, the tubular member 8 is separated from the central axis I0 slightly more than the pair of stator holding portions 22 (curved holding surfaces 221). Such a clearance Δ1 may be a minimum value at which oil can be discharged from an oil hole 81 described later.

As shown in FIG. 4, the tubular member 8 has the oil hole 81 communicating with the oil passage 80. The oil hole 81 is formed so that it can discharge oil toward the coil end 321 on one side in the axial direction (Y1 side). A plurality of the oil holes 81 may be provided along the circumferential direction and/or along the axial direction. In this case, the oil holes 81 can discharge oil in various directions toward the coil end 321, so that the coil end 321 can be more uniformly cooled along its entire circumference. For example, the oil hole 81 may be formed so as to discharge oil in a tangential direction to the outer peripheral portion of the coil end 321 as viewed in the axial direction. The coil end 321 may extend on the opposite side from leads.

As shown in FIG. 4, the tubular member 8 further has an oil hole 82 communicating with the oil passage 80. The oil hole 82 is formed so that it can discharge oil in the oil passage 80 toward the coil end 322 on the other side in the axial direction (Y2 side). A plurality of the oil holes 82 may be provided along the circumferential direction and/or along the axial direction. In this case, the oil holes 82 can discharge oil in various directions toward the coil end 322, so that the coil end 322 can be more uniformly cooled along its entire circumference. For example, the oil hole 82 may be formed so as to discharge oil in a tangential direction to the outer peripheral portion of the coil end 322 as viewed in the axial direction. The coil end 322 may extend on the lead side.

The tubular member 8 has similar oil holes 83, 84 facing the outer peripheral surface of the stator core 31 in the radial direction, in addition to the oil hole 81 facing the coil end 321 on the Y1 side in the radial direction.

The oil hole 83 is provided on the Y1 side with respect to the middle position in the axial direction of the stator core 31 within the range in which the stator core 31 extends in the axial direction. In the present embodiment, as shown in FIGS. 4 and 5, the oil hole 83 is located within the range in which the rib portion 28 extends in the axial direction (see also FIG. 7B). A plurality of the oil holes 83 may be provided along the circumferential direction and/or along the axial direction. In this case, the oil holes 83 can discharge oil in various directions toward the stator core 31, so that the stator core 31 can be more uniformly cooled along its entire circumference.

In the present embodiment, referring to FIG. 7B, the oil holes 83 include an oil hole 830 (see FIG. 7B) for discharging oil toward the side in the circumferential direction on which the radial protrusion 34 is not located, and an oil hole 831 (see FIG. 7B) for discharging oil toward the side in the circumferential direction on which the radial protrusion 34 is located, as will be described in detail later. For example, the oil hole 830 may be formed so as to discharge oil in a tangential direction to the outer peripheral surface of the stator core 31 as viewed in the axial direction. The oil holes 83 may include a hole for discharging oil directly downward (e.g., substantially in the same direction as the direction toward the central axis I0), in addition to the oil hole 830 and the oil hole 831.

The oil hole 84 is provided on the Y2 side with respect to the middle position in the axial direction of the stator core 31. A plurality of the oil holes 84 may be provided along the circumferential direction and/or along the axial direction. In this case, the oil holes 84 can discharge oil in various directions toward the stator core 31, so that the stator core 31 can be more uniformly cooled along its entire circumference. For example, the oil hole 84 may be formed so as to discharge oil in a tangential direction to the outer peripheral surface of the stator core 31 as viewed in the axial direction.

In the present embodiment, there is the radial clearance Δ1 between the tubular member 8 and the outer peripheral surface of the stator core 31 as described above. Therefore, oil can be discharged from such oil holes 83, 84 (oil holes 83, 84 facing the stator core 31 in the radial direction) to the outer peripheral surface of the stator core 31. The coil 32 in the slots 311 can thus be cooled via the stator core 31.

Although only one tubular member 8 is provided in the present embodiment, two or more tubular members 8 may be provided.

Next, the flow of oil discharged from the tubular member 8 according to the present embodiment will be described with reference to FIG. 7A.

Figure 7A:
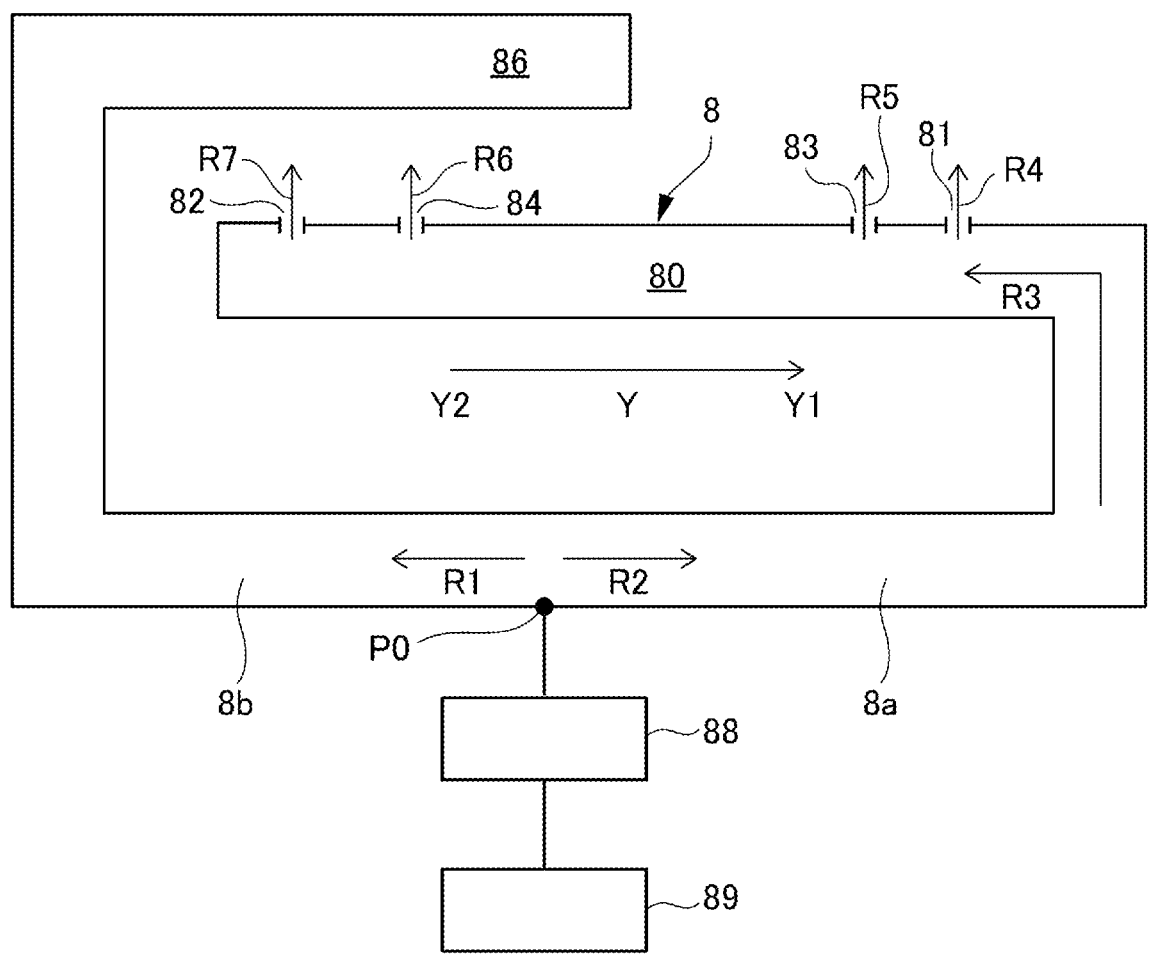
FIG. 7A is a diagram schematically showing an oil passage structure.

FIG. 7A is a diagram schematically showing an oil passage structure including the tubular member 8 according to the present embodiment. In FIG. 7A, oil flows are schematically shown by arrows R1 to R7.

The oil passage structure according to the present embodiment includes a first supply oil passage 8a, a second supply oil passage 8b, the oil passage 80 (tubular member 8) described above, and the axial oil passage 86 described above.

The first supply oil passage 8a communicates with the oil passage 80. The second supply oil passage 8b communicates with the axial oil passage 86. The first supply oil passage 8a and the second supply oil passage 8b are connected to each other and are supplied with oil from an oil supply position P0. The oil may be supplied via an oil pump 89 and an oil cooler 88.

The oil supplied to the first supply oil passage 8a (see arrow R2) flows into the oil passage 80 (see arrow R3). The oil having flowed into the oil passage 80 is discharged toward the coil end 321 through the oil hole 81 (see arrow R4), and is also discharged toward the coil end 322 through the oil hole 82 (see arrow R7). The oil is also discharged toward the stator core 31 through the oil holes 83, 84 (see arrows R5, R6).

The oil supplied to the second supply oil passage 8b (see arrow R1) is supplied to the axial oil passage 86, and is used to cool the rotor core 40 and/or the permanent magnets as described above.

In the present embodiment, as described above, the oil passage 80 (tubular member 8) has the oil holes 82, 84 on the Y2 side in addition to the oil holes 81, 83 on the Y1 side. However, the oil passage 80 may have only the oil holes 81, 83, or may have only the oil holes 81, 83, and 84. In this case, an oil passage for cooling the coil end 322 may be formed on the second supply oil passage 8b side. In addition to the oil passage 80, the axial oil passage 86 may also be connected to the first supply oil passage 8a. The oil passage 80 may have only the oil hole 83, or may have only the oil holes 83, 84.

Next, the flow of oil discharged from the oil hole 83 and the oil dropping function of the rib portion 28 will be described with reference to FIG. 7B. In the following description, the radial protrusion 34 refers to the upper radial protrusion 34 out of the three radial protrusions 34.

Figure 7B:
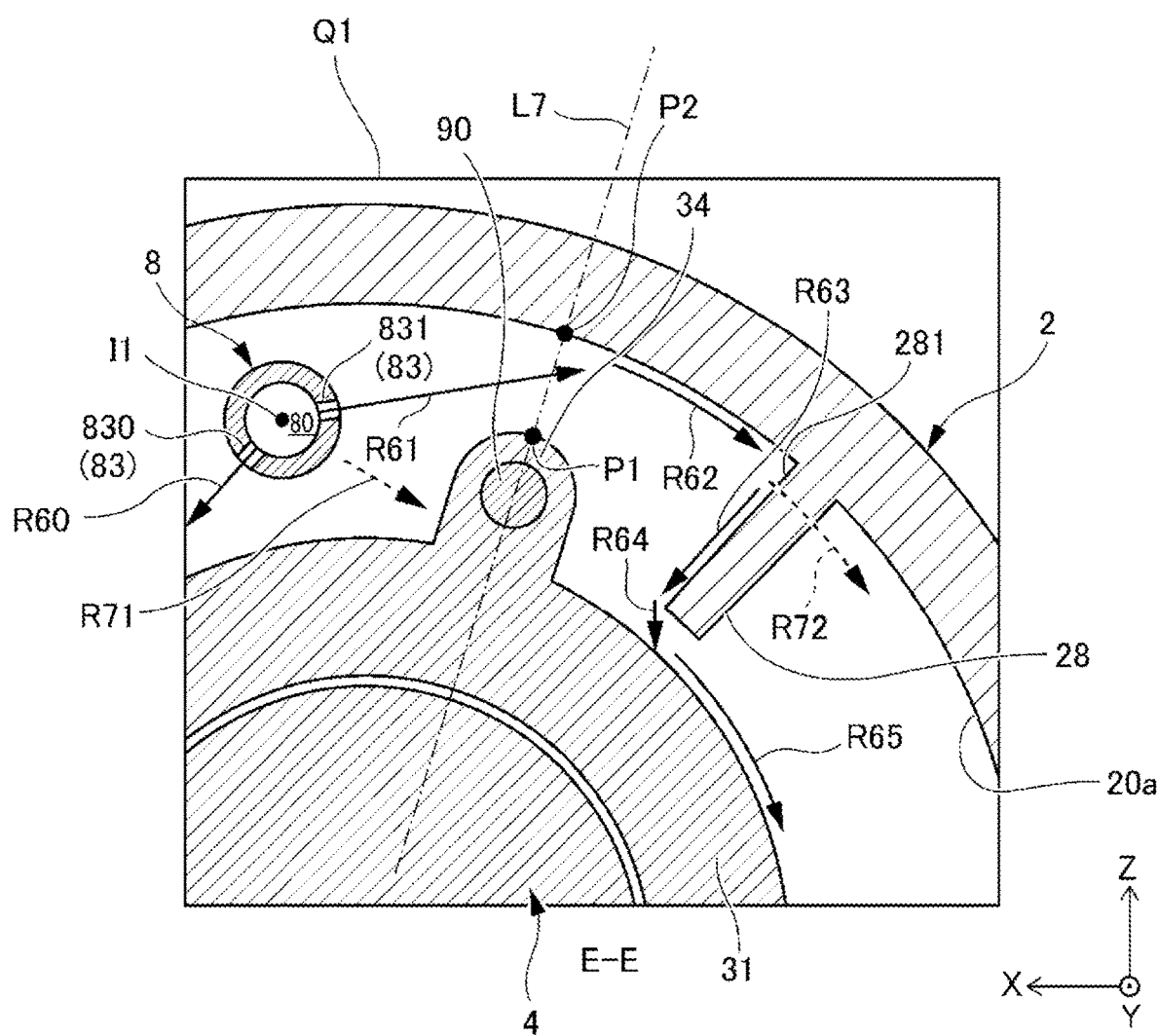
FIG. 7B is a sectional view taken along line E-E in FIG. 4.

FIG. 7B is a sectional view in the range of a portion Q1 shown in FIG. 1, and is a sectional view taken along line E-E (see FIG. 4) passing through the oil hole 831. In FIG. 7B, oil flows are schematically shown by arrows R60 to R65. In FIG. 7B, oil flows for comparison are also schematically shown by dashed arrows R71, R72.

As shown in FIG. 7B, oil flowing through the oil passage 80 of the tubular member 8 is discharged into the space between the stator core 31 and the inner peripheral surface 20a of the case 2 through the oil holes 83 (oil holes 830, 831). In the present embodiment, as described above, the oil holes 83 include the oil hole 830 for discharging oil toward the side in the circumferential direction on which the radial protrusion 34 is not located, and the oil hole 831 for discharging oil toward the side in the circumferential direction on which the radial protrusion 34 is located.

As shown by arrow R60, the oil hole 830 discharges oil radially inward in such a manner that the oil hits the outer peripheral surface of the stator core 31. For example, the direction in which oil is discharged from the oil hole 830 may be adapted to a direction along the outer peripheral surface of the stator core 31 (tangential direction as viewed in the axial direction). The oil discharged from the oil hole 830 thus flows downward due to gravity along the outer peripheral surface of the stator core 31 on the side in the circumferential direction on which the radial protrusion 34 is not located. Accordingly, the stator core 31 (stator core 31 and coil 32 in the slots 311) can be properly cooled.

On the other hand, as shown by arrow R61, the oil hole 831 discharges oil in a direction toward a position radially outward of the radial protrusion 34 as viewed in the axial direction. For example, as shown in FIG. 7B, the direction in which oil is discharged from the oil hole 831 may be a direction toward any position between an outermost radial position P1 of the radial protrusion 34 and a position P2 on the inner peripheral surface 20a of the case 2 along a line L7. In this case, the line L7 may be a straight line passing through the central axis I0 and through the center of the radial protrusion 34 (e.g., the center of the fastener 90) as viewed in the axial direction.

In order to achieve such an oil discharge direction, the oil hole 831 may open more upward than the oil hole 830 and may be located above the oil hole 830, as shown in FIG. 7B.

The position and orientation of the oil hole 831 may be such that the discharged oil stably hits the inner peripheral surface 20a of the case 2. In this case, the oil may hit the inner peripheral surface 20a of the case 2 at a position closer to the rib portion 28 than the position P2. An oil flow along the inner peripheral surface 20a of the case 2 toward the rib portion 28 (see arrow R62) can thus be stably formed. In a modification, the position and orientation of the oil hole 831 may be such that the oil stably hits a side surface 281 of the rib portion 28 (side surface 281 on the radial protrusion 34 side).

In the present embodiment, the radial protrusion 34 is located on the side to which oil is discharged from the oil hole 831, unlike the oil hole 830. Therefore, if the direction in which oil is discharged from the oil hole 831 is such a direction that the oil directly hits the outer peripheral surface of the stator core 31 like the oil hole 830, the oil flow will be blocked by the radial protrusion 34 (arrow R71). In such a case, the stator core 31 may not be able to be properly cooled on the side in the circumferential direction on which the radial protrusion 34 is located (which will be described later with reference to FIG. 8).

In this regard, in the present embodiment, the radial protrusion 34 is located on the side to which oil is discharged from the oil hole 831, but the direction in which oil is discharged from the oil hole 831 is the direction toward the position radially outward of the radial protrusion 34 as viewed in the axial direction, as described above. This can reduce the possibility that the oil flow may be blocked by the radial protrusion 34 (see arrow R71).

In the present embodiment, as described above, the direction in which oil is discharged from the oil hole 831 is the direction toward the position radially outward of the radial protrusion 34 as viewed in the axial direction. Therefore, the oil flow that will not be blocked by the radial protrusion 34 can be implemented, but some oil flows along the inner peripheral surface 20a of the case 2. The oil that flows along the inner peripheral surface 20a of the case 2 tends to continue to flow along the inner peripheral surface 20a of the case 2 toward the lower side of the rotating electrical machine 1 due to gravity (see arrow R72). Since such an oil flow does not significantly contribute to cooling of the stator core 31, the stator core 31 may still not be able to be properly cooled on the side in the circumferential direction on which the radial protrusion 34 is located.

In this regard, in the present embodiment, the rib portion 28 is provided as described above. Therefore, the oil that flows along the inner peripheral surface 20a of the case 2 toward the lower side of the rotating electrical machine 1 due to gravity (see arrow R72) can be reduced or eliminated by the oil dropping function of the rib portion 28.

Specifically, when the oil flowing along the inner peripheral surface 20a of the case 2 reaches the base on the side surface 281 side (end on the inner peripheral surface 20a side) of the rib portion 28, the oil flow is blocked by the rib portion 28, so that the oil flows radially inward along the side surface 281 of the rib portion 28 (see arrow R63). The oil flowing radially inward along the side surface 281 of the rib portion 28 drops downward from the radially inner end of the rib portion 28 due to gravity (see arrow R64). The oil having dropped downward hits the outer peripheral surface of the stator core 31. That is, in the present embodiment, the rib portion 28 overlaps the stator core 31 as viewed in the up-down direction, as described above. Therefore, the oil that drops from the rib portion 28 will be received by the outer peripheral surface of the stator core 31. As a result, the oil that drops from the rib portion 28 can subsequently flow downward along the outer peripheral surface of the stator core 31 due to gravity (see arrow R65). The stator core 31 (stator core 31 and coil 32 in the slots 311) can be properly cooled by such oil.

As described above, according to the present embodiment, by appropriately setting the direction in which oil is discharged from the oil hole 831 and implementing the oil dropping function of the rib portion 28, the stator core 31 (stator core 31 and coil 32 in the slots 311) can be properly cooled even on the side in the circumferential direction on which the radial protrusion 34 is located.

Next, effects of the present embodiment regarding cooling of the stator 3 (stator core 31 and coil 32 in the slots 311) using the oil holes 83 described above will be described in comparison with comparative examples with reference to FIGS. 8 and 9.

Figure 8:
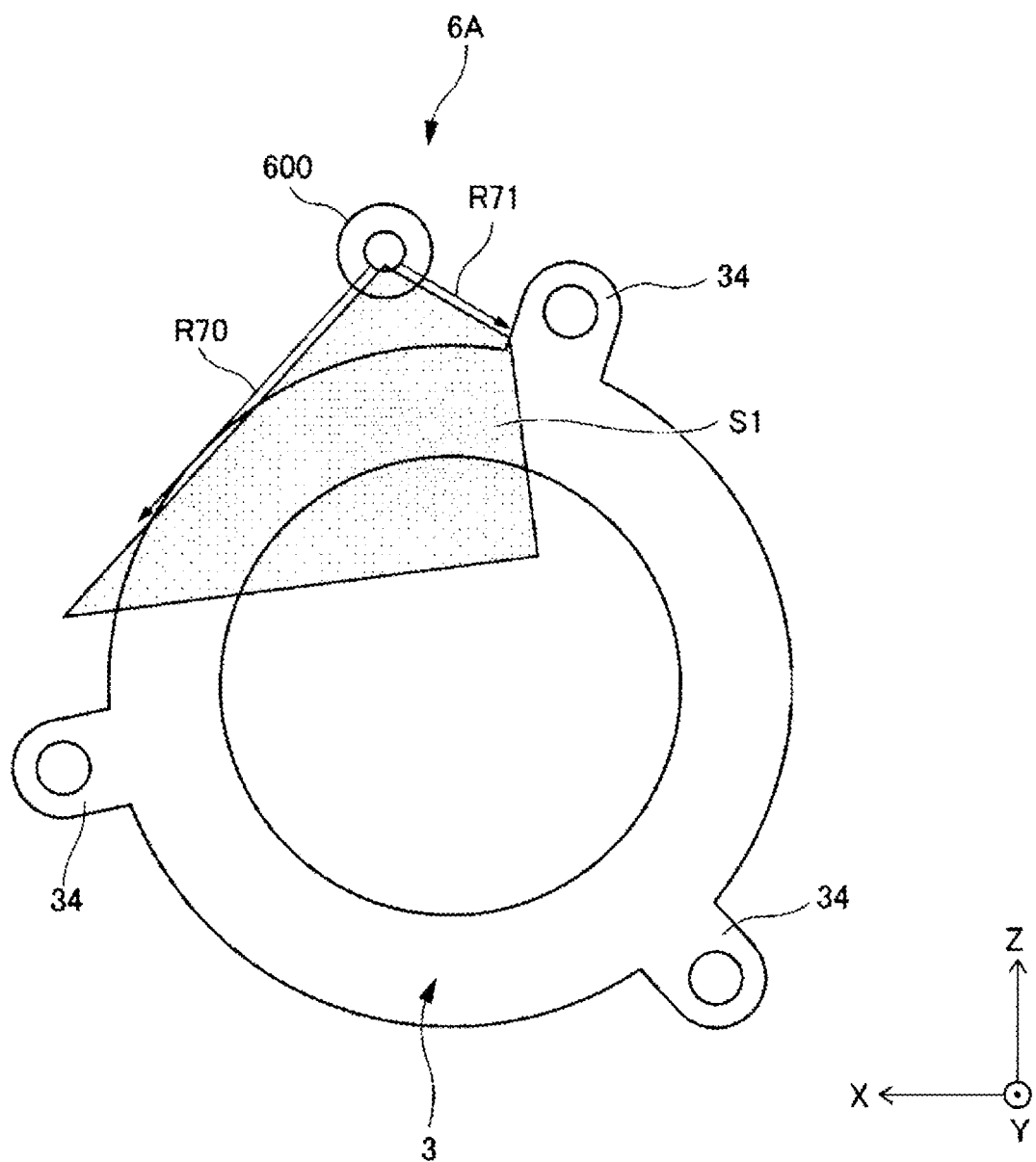
FIG. 8 is an illustration of an oil passage structure according to a first comparative example.

FIG. 8 is an illustration of an oil passage structure 6A according to a first comparative example, schematically showing the oil passage structure 6A and the stator 3 as viewed in the axial direction. In FIG. 8, arrows R70, R71 schematically indicate the directions in which oil is discharged, and a hatched area 51 schematically indicates the range covered by the discharged oil (coolable area).

In the oil passage structure 6A according to the first comparative example, a tubular member 600 is provided in a manner similar to that in the present embodiment. However, oil is discharged from the tubular member 600 toward the outer peripheral surface of the stator 3 on both sides in the circumferential direction.

In such a first comparative example, when the tubular member 600 is located at a radial position similar to that of the radial protrusion 34 as shown in FIG. 8, the oil distribution is likely to be blocked by the radial protrusion 34 (see arrow R71 in comparison with arrow R70). As a result, as shown by the hatched area 51, the range covered by the oil discharged from the tubular member 600 toward the stator core (coolable area of the stator core) will not become uniform in the circumferential direction, which tends to cause unsatisfactory cooling.

On the other hand, in the present embodiment, as described above, uniform cooling of the stator core 31 and the coil 32 in the slots 311 can be implemented on both sides of the tubular member 8 (or the radial protrusion 34) in the circumferential direction, based on the oil discharged from each oil hole 83 of the tubular member 8.

Figure 9:
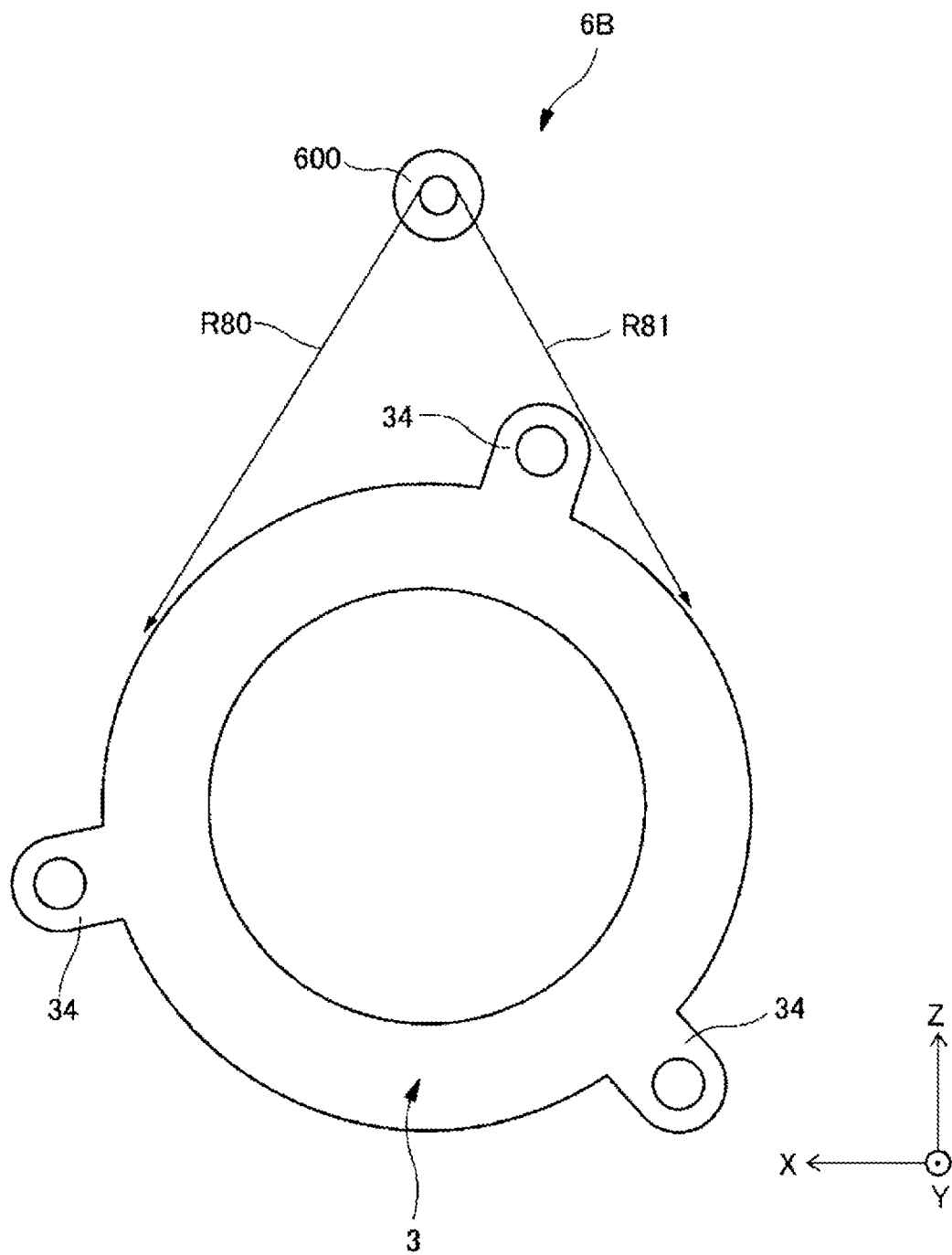
FIG. 9 is an illustration of an oil passage structure according to a second comparative example.

FIG. 9 is an illustration of an oil passage structure 6B according to a second comparative example, schematically showing the oil passage structure 6B and the stator 3 as viewed in the axial direction.

The oil passage structure 6B according to the second comparative example is configured so that the tubular member 600 that is a separate member from the case extends in the Y direction. In the second comparative example, unlike in the first comparative example described above, the tubular member 600 is disposed at a radial position farther away from the stator 3 than the radial protrusion 34. In this case, the oil distribution will not be blocked by the radial protrusion 34 (see arrow R81 in comparison with arrow R80). Therefore, the disadvantage of the first comparative example can be partially eliminated.

In the second comparative example, however, the overall radial size of the rotating electrical machine tends to increase because the tubular member 600 is disposed at the radial position away from the stator 3. That is, the overall radial size of the rotating electrical machine tends to increase by an amount corresponding to the space for mounting the tubular member 600.

In this regard, in the present embodiment, the tubular member 8 is located at a radial position similar to that of the radial protrusion 34, as described above. This can prevent an increase in overall radial size of the rotating electrical machine 1 due to the tubular member 8. As described above, according to the present embodiment, the oil passage 80 that can implement uniform cooling in the circumferential direction can be achieved while reducing the overall radial size and cost of the rotating electrical machine 1 including the case 2.

Next, a modification of the embodiment described above will be described with reference to FIG. 10.

Figure 10:
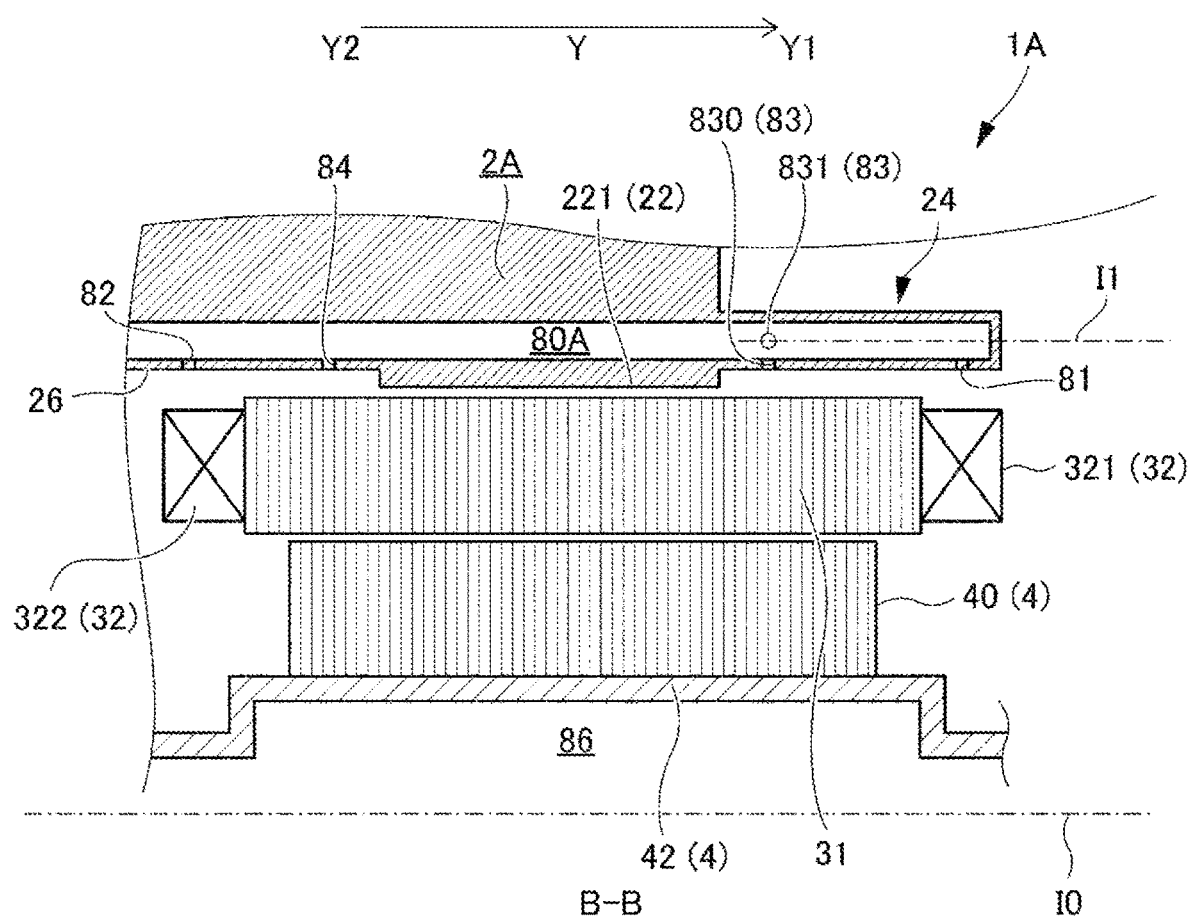
FIG. 10 is a schematic sectional view of a main part of a rotating electrical machine according to a modification.

FIG. 10 is a schematic sectional view of a main part of a rotating electrical machine 1A according to the modification, showing a section corresponding to FIG. 4 described above (section taken along line B-B in FIG. 1).

The rotating electrical machine 1A according to the modification is different from the rotating electrical machine 1 according to the embodiment described above in that the case 2 is replaced with a case 2A. The tubular member 8 is provided in the embodiment described above. In the modification, however, a similar function is implemented by an oil passage 80A formed in the case 2A instead of the tubular member 8. Specifically, an oil passage forming portion 24 extending toward the Y1 side in the axial direction is provided in the stator holding portion 22 of the case 2A. The oil passage forming portion 24 is integral with the stator holding portion 22. The oil passage 80A is formed in the oil passage forming portion 24 and the stator holding portion 22. The oil passage 80A itself may have the same configuration as the oil passage 80 described above. That is, the oil passage 80A has the oil holes 830, 831 etc. described above. In FIG. 10, the end on the Y1 side of the oil passage 80A is closed, and oil may be supplied to the oil passage 80A from the Y2 side. According to this modification, the effects of the embodiment described above can be obtained while reducing the number of parts. When the oil passage forming portion 24 has a tubular shape different from that of the stator holding portion 22, the oil passage 80A for cooling the stator core 31 (stator core 31 and coil 32 in the slots 311) and the coil end 321 on the Y1 side can be formed while minimizing the set range of the stator holding portion 22 in the circumferential direction (and reducing the material cost).

Although the embodiments are described in detail above, the present disclosure is not limited to specific embodiments, and various modifications and changes can be made within the scope of the claims. It is also possible to combine all or part of the constituent elements of the embodiments described above. Of the effects of each embodiment, those related to dependent claims are additional effects distinct from generic concepts (independent claim).

For example, in the embodiment described above, the rib portion 28 is integral with the case 2. However, the rib portion 28 may be a separate member from the case 2. In this case, the rib portion 28 may be fixed to the case 2 by welding, a fixing tool, etc.

DESCRIPTION OF THE REFERENCE NUMERALS

1 . . . rotating electrical machine, 3 . . . stator, 4 . . . rotor, 8 . . . tubular member (oil passage portion), 31 . . . stator core, 32 . . . coil, 34 . . . radial protrusion, 2 . . . case (housing member), 20a . . . inner peripheral surface, 24 . . . oil passage forming portion (member in tubular shape), 28 . . . rib portion, 80 . . . oil passage, 83 (831) . . . oil hole (discharge hole), 10 . . . central axis (rotation center)

The invention claimed is:

1. A rotating electrical machine including
a rotor,
a stator including a stator core and a coil, and including a radial protrusion for fastening located above a rotation center of the rotor,
a housing member that houses the rotor and the stator and to which the radial protrusion is fastened, and
an oil passage portion located above the rotation center of the rotor and extending in an axial direction within a range in which the stator core extends in the axial direction, the oil passage portion having a discharge hole that discharges oil in a direction toward a position radially outward of the radial protrusion as viewed in the axial direction, the rotating electrical machine further comprising
a rib portion that is provided above the rotation center of the rotor in the housing member, that protrudes radially inward from an inner peripheral surface of the housing member, and that overlaps the stator core as viewed in an up-down direction, wherein
the discharge hole is provided within a range in which the rib portion extends in the axial direction, and
the oil passage portion, the radial protrusion, and the rib portion are located in this order as viewed in the axial direction.

2. The rotating electrical machine according to claim 1, further comprising a member in a tubular shape that is housed in the housing member, wherein
the oil passage portion is located in the member in the tubular shape.

3. The rotating electrical machine according to claim 1, wherein the oil passage portion is located in the housing member.

4. The rotating electrical machine according to claim 1, wherein at least part of the oil passage portion is located at a position radially inward of the radial protrusion as viewed in the axial direction.

5. The rotating electrical machine according to claim 1, wherein the rib portion has a function to drop, toward the stator core, oil flowing along the inner peripheral surface of the housing member out of the oil discharged from the discharge hole in the direction toward the position radially outward of the radial protrusion as viewed in the axial direction.

6. The rotating electrical machine according to claim 2, wherein at least part of the oil passage portion is located at a position radially inward of the radial protrusion as viewed in the axial direction.

7. The rotating electrical machine according to claim 3, wherein at least part of the oil passage portion is located at a position radially inward of the radial protrusion as viewed in the axial direction.

8. The rotating electrical machine according to claim 2, wherein the rib portion has a function to drop, toward the stator core, oil flowing along the inner peripheral surface of the housing member out of the oil discharged from the discharge hole in the direction toward the position radially outward of the radial protrusion as viewed in the axial direction.

9. The rotating electrical machine according to claim 3, wherein the rib portion has a function to drop, toward the stator core, oil flowing along the inner peripheral surface of the housing member out of the oil discharged from the discharge hole in the direction toward the position radially outward of the radial protrusion as viewed in the axial direction.

10. The rotating electrical machine according to claim 4, wherein the rib portion has a function to drop, toward the stator core, oil flowing along the inner peripheral surface of the housing member out of the oil discharged from the discharge hole in the direction toward the position radially outward of the radial protrusion as viewed in the axial direction.

11. The rotating electrical machine according to claim 6, wherein the rib portion has a function to drop, toward the stator core, oil flowing along the inner peripheral surface of the housing member out of the oil discharged from the discharge hole in the direction toward the position radially outward of the radial protrusion as viewed in the axial direction.

12. The rotating electrical machine according to claim 7, wherein the rib portion has a function to drop, toward the stator core, oil flowing along the inner peripheral surface of the housing member out of the oil discharged from the discharge hole in the direction toward the position radially outward of the radial protrusion as viewed in the axial direction.

* * * * *